(12) United States Patent
Yemme et al.

(10) Patent No.: US 11,694,216 B2
(45) Date of Patent: Jul. 4, 2023

(54) DATA DRIVEN CUSTOMER LOYALTY PREDICTION SYSTEM AND METHOD

(71) Applicant: JPMorgan Chase Bank, N.A., New York, NY (US)

(72) Inventors: Mallikarjuna R. Yemme, McKinney, TX (US); Mark P. Macke, Tampa, FL (US); Raymond John Nawara, II, Lutz, FL (US); Venkata Sesha Rao Kolli, Tampa, FL (US); Mihir Patel, Tampa, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 87 days.

(21) Appl. No.: 16/220,665

(22) Filed: Dec. 14, 2018

(65) Prior Publication Data
US 2019/0188735 A1    Jun. 20, 2019

Related U.S. Application Data

(60) Provisional application No. 62/598,713, filed on Dec. 14, 2017.

(51) Int. Cl.
| | |
|---|---|
| *G06Q 30/0201* | (2023.01) |
| *G06Q 30/0238* | (2023.01) |
| *G06Q 30/0207* | (2023.01) |
| *G06N 20/00* | (2019.01) |
| *G06N 7/01* | (2023.01) |

(52) U.S. Cl.
CPC ........... *G06Q 30/0201* (2013.01); *G06N 7/01* (2023.01); *G06N 20/00* (2019.01); *G06Q 30/0224* (2013.01); *G06Q 30/0238* (2013.01)

(58) Field of Classification Search
None
See application file for complete search history.

(56) References Cited

U.S. PATENT DOCUMENTS

| | | | | |
|---|---|---|---|---|
| 10,096,043 B2 * | 10/2018 | Beck | ................... | G06Q 30/0267 |
| 10,438,216 B1 * | 10/2019 | Parekh | .................... | G06N 20/00 |
| 10,664,861 B1 * | 5/2020 | Kim | ................... | G06Q 30/0244 |
| 2005/0189414 A1 * | 9/2005 | Fano | .................. | G06Q 30/0255 |
| | | | | 235/383 |
| 2006/0122921 A1 * | 6/2006 | Comerford | ........ | G06Q 30/0226 |
| | | | | 705/35 |

(Continued)

OTHER PUBLICATIONS

Buckinx et al., Predicting customer loyalty using the internal transactional database, Expert Systems with Applications, vol. 32, Issue 1, 2007, pp. 125-134 (Year: 2007).*

(Continued)

*Primary Examiner* — Darlene Garcia-Guerra
(74) *Attorney, Agent, or Firm* — Greenblum & Bernstein, P.L.C.

(57) ABSTRACT

Systems and methods are provided to predict customer behavior during a digital transaction at a point of sale. The disclosed systems and methods can collect information regarding a merchant and the merchant's business as well as information about the current sales environment in which the merchant is operating. From the collected information, the disclosed systems and methods can process the collected information to generate a prediction of future customer behavior in real-time or near real-time.

20 Claims, 6 Drawing Sheets

(56) References Cited

U.S. PATENT DOCUMENTS

| | | | | |
|---|---|---|---|---|
| 2008/0133350 | A1* | 6/2008 | White | G06Q 20/06 705/14.27 |
| 2009/0132347 | A1* | 5/2009 | Anderson | G06Q 30/02 705/14.52 |
| 2009/0204496 | A1* | 8/2009 | Otto | G06Q 40/12 705/14.69 |
| 2010/0070335 | A1* | 3/2010 | Parekh | G06Q 30/0254 705/14.52 |
| 2010/0280880 | A1* | 11/2010 | Faith | G06Q 40/00 705/7.37 |
| 2010/0280882 | A1* | 11/2010 | Faith | G06Q 20/4016 705/7.37 |
| 2011/0231225 | A1* | 9/2011 | Winters | G06Q 30/0201 705/7.29 |
| 2012/0022944 | A1* | 1/2012 | Volpi | G06Q 30/0268 705/14.53 |
| 2012/0066062 | A1* | 3/2012 | Yoder | G06Q 30/02 705/14.51 |
| 2012/0136704 | A1* | 5/2012 | Carlson | G06Q 20/10 705/14.17 |
| 2012/0310831 | A1* | 12/2012 | Harris | G06Q 30/02 705/44 |
| 2013/0046603 | A1* | 2/2013 | Grigg | G06Q 30/0261 705/14.25 |
| 2013/0151388 | A1* | 6/2013 | Falkenborg | G06Q 40/10 705/35 |
| 2013/0268468 | A1* | 10/2013 | Vijayaraghavan | G06N 20/00 706/12 |
| 2014/0006165 | A1* | 1/2014 | Grigg | G06Q 30/0281 705/14.64 |
| 2014/0195396 | A1* | 7/2014 | Bhakta | G06Q 40/02 705/35 |
| 2014/0279420 | A1* | 9/2014 | Okerlund | G06Q 20/387 705/39 |
| 2014/0297363 | A1* | 10/2014 | Vemana | G06Q 30/0269 705/7.29 |
| 2015/0112790 | A1* | 4/2015 | Wolinsky | G06Q 20/32 705/14.38 |
| 2015/0324789 | A1* | 11/2015 | Dvorak | G06Q 20/3274 705/67 |
| 2015/0332296 | A1* | 11/2015 | Chu | G06Q 30/0202 705/7.33 |
| 2015/0339673 | A1* | 11/2015 | Adjaoute | G06F 21/6245 705/30 |
| 2015/0348083 | A1* | 12/2015 | Brill | H04M 15/44 705/14.23 |
| 2016/0148224 | A1* | 5/2016 | Misra | G06Q 30/0202 705/7.31 |
| 2016/0162917 | A1* | 6/2016 | Singh | G06Q 30/0204 705/7.33 |
| 2016/0247175 | A1* | 8/2016 | Milton | G06Q 30/0205 |
| 2017/0061286 | A1* | 3/2017 | Kumar | G06Q 30/0269 |
| 2017/0278125 | A1* | 9/2017 | Tietzen | G06Q 30/0229 |
| 2017/0323345 | A1* | 11/2017 | Flowers | G06Q 10/063112 |
| 2018/0005285 | A1* | 1/2018 | Narasimhan | G06Q 30/0605 |
| 2018/0181964 | A1* | 6/2018 | Zagarese | G06Q 20/3821 |
| 2018/0197200 | A1* | 7/2018 | Zoldi | G06Q 30/0255 |

OTHER PUBLICATIONS

Buckinx, Wouter, and Dirk Van den Poel. "Customer base analysis: partial defection of behaviourally loyal clients in a non-contractual FMCG retail setting." European journal of operational research 164.1 (2005): 252-268. (Year: 2005).*

Kiran, Vasanth, Mousumi Majumdar, and Krishna Kishore. "Innovation in in-store promotions: effects on consumer purchase decision." European Journal of Business and Management 4.9 (2012) (Year: 2012).*

Nsakanda, Aaron Luntala, Moustapha Diaby, and Yuheng Cao. "A predictive model of redemption and liability in loyalty reward programs industry." 2010 43rd Hawaii International Conference on System Sciences. IEEE, 2010 (Year: 2010).*

Rygielski, Chris, Jyun-Cheng Wang, and David C. Yen. "Data mining techniques for customer relationship management." Technology in society 24.4 (2002): 483-502 (Year: 2002).*

* cited by examiner

- Linear regression: calculate a linear function and then a threshold
- Logistic regression: estimate class probabilities directly
  $Pr[1 | a_1, a_2, \ldots, a_k] = 1/(1 + \exp(-w_0 - w_1 a_1 - \ldots - w_k a_k))$ ← 304

- Choose weights to maximize the log-likelihood (not minimize the squared error):
  $\sum_{i=1}^{n} (1 - x^{(i)}) \log(1 - Pr[1 | a_1^{(i)}, a_2^{(i)}, \ldots, a_k^{(i)}]) + x^{(i)} \log(Pr[1 | a_1^{(i)}, a_2^{(i)}, \ldots, a_k^{(i)}])$

DATA DRIVEN CUSTOMER LOYALTY PREDICTION SYSTEM AND METHOD

TECHNICAL FIELD

The present disclosure generally relates to systems and methods for predicting the likelihood of customer loyalty and value at the time of a sales transaction.

BACKGROUND

Customer loyalty is key to the success of many small businesses. However, some businesses generally lack the data and resources to identify potentially valuable or loyal customers in a manner and time that permits the business to respond to the customer appropriately at a point of sale. Because of the limited resources that businesses have available to market to new customers and retain existing customers, being able to identify potentially loyal (and thus more valuable) customers for which to focus resources is critical. In addition, in many small businesses, the customer transaction is of short duration. As such, many small businesses do not have the opportunity to identify and then market to the customer at the time of sale using conventional methods.

Therefore a need exists for systems and methods for identifying potentially loyal repeat customers at the time of sale using information easily and unobtrusively obtainable at the time of sale.

SUMMARY

In an exemplary embodiment, a data ecosystem may receive transaction data during and in conjunction with the approval process of a purchase card transaction. The data ecosystem can process the transaction data in conjunction with historical data and environmental data in order to identify whether the customer is likely to be a desirable customer in the future.

In another exemplary embodiment, the data ecosystem employs a logistic regression algorithm to estimate behavioral probabilities of the customer. The algorithm can learn from historical data and apply variable weights to fine-tune the predicted behavior.

In yet another exemplary embodiment, a prediction of future customer behavior produced by the data ecosystem is used to provide an indication of the behavior to a merchant in real-time or near real-time. In some exemplary embodiments, one or more promotional offers may be determined based on the likelihood of desirable future customer behavior. In such embodiments, these offers may be presented to a merchant during payment card processing for a sale so that the merchant can provide the customer with these offers to reward or encourage more of the type of customer behavior desired by the merchant. By providing such offers during the payment processing, the merchant has the opportunity to interact directly with the customer to encourage the desired behavior. For instance, if the merchant wishes to encourage the customer to visit more frequently, the offer may consist of a reward or discount that results from frequent visits. Another exemplary embodiment may present the customer with free upgrades or additions in conjunction with the pending transaction. As a result, the customer is encouraged to take action while they are already at the merchant. This differs from the delayed interaction that may (or may not) take place as the result of a printed coupon or similar future offering.

In yet another exemplary embodiment, a method for predicting future customer behavior at a point of sale is provided. The method comprising: receiving current transaction data related to a digital transaction between a merchant and a customer at the point of sale; receiving historical transaction data related to past purchasing behavior of the customer; identifying the customer as a desirable customer based on the current transaction data and the historical transaction data.

In yet another exemplary embodiment, a system for predicting future customer behavior at a point of sale is provided. The system comprising: a data ecosystem configured to: collect current transaction data related to a digital transaction between a merchant and a customer at the point of sale; receive historical transaction data related to past purchasing behavior of a customer; identify the customer as a desirable customer based on the current transaction data and the historical transaction data.

In yet another exemplary embodiment, A method for offering a promotional award at the point of sale between a customer and a merchant, the method comprising: receiving current transaction data related to a digital transaction between the customer and the merchant; receiving historical transaction data related to past purchasing behavior of the customer; identifying the customer as a desirable customer based on the current transaction data and the historical transaction data; and, generating at least one promotional offer for the customer.

These and other objects, features, and advantages of the present disclosure will become apparent form the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Figure 1:
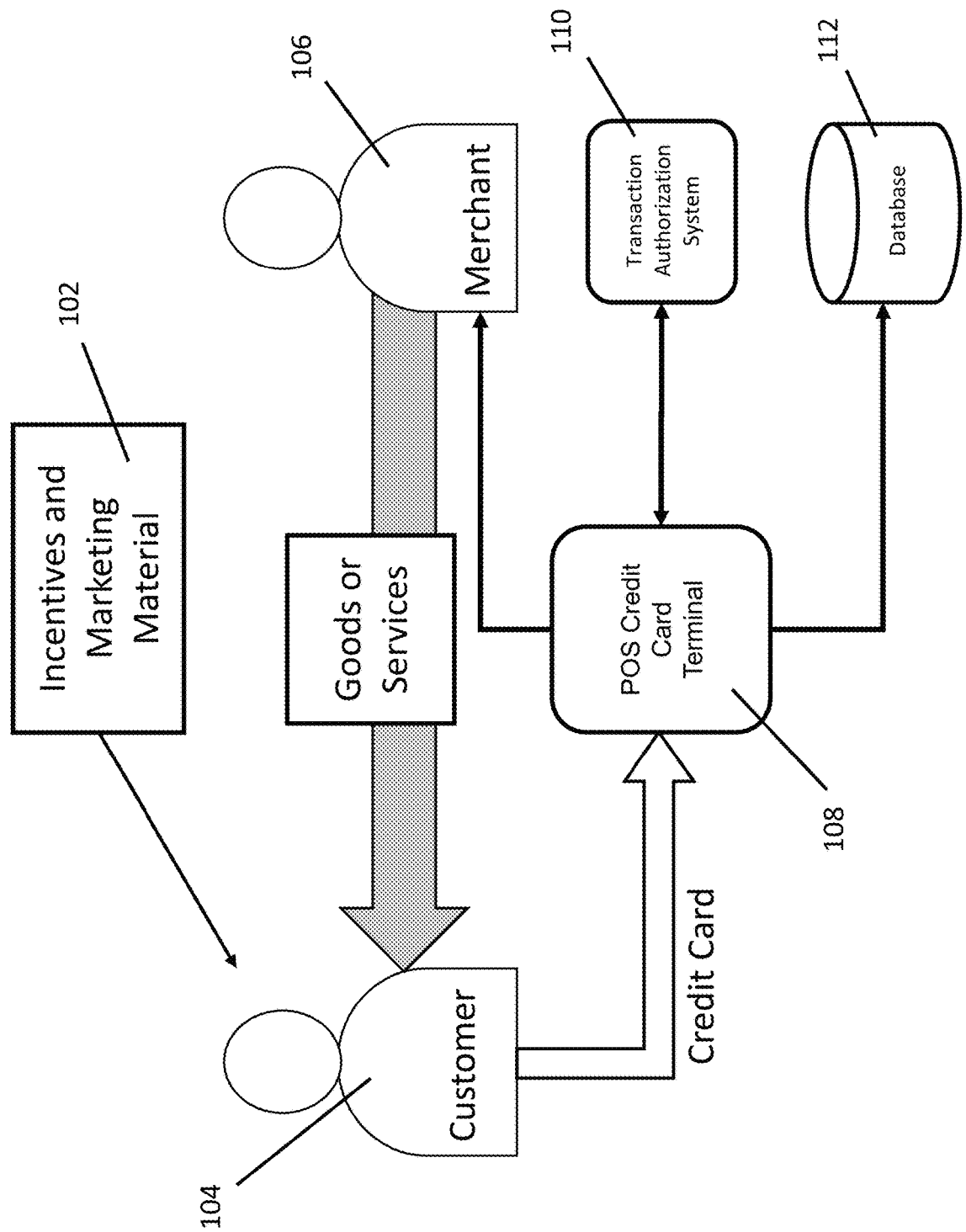
FIG. 1 is a diagram illustrating known methods of interaction between merchants and customers conducting an electronic transaction at a point of sale.

As is illustrated in FIG. 1, known methods of marketing to a customer 104 before and at the time of sale include providing incentives and advertising materials 102 directly at the point of sale. These incentives and materials are frequently directed to the general public as is the case with direct mail, radio, or television advertising. This unfocused approach does not allow merchants 106 to focus their efforts on potential customers or current customers that are likely to be desirable customers (e.g., those that are frequent customers, those that make large purchases, or both). Using known methods, the interaction between the customer 104 and the merchant 106 was generally limited to the exchange of goods or services and a payment for those goods and services. As is illustrated, when a customer 104 pays using a purchase card or credit card, the card is presented to a point of sale (POS) terminal 108. The POS terminal 108 reads the card information and contacts a transaction authorization system 110. The transaction authorization system 110 is provided with such information as the card number, transaction account, and certain authorization codes. This information is then used to authorize (or decline) the transaction. In some cases, the transaction information may be stored in a database 112.

When a customer 104 uses a purchase card to conduct a transaction, the card processor generally obtains a certain amount of information about the customer. For example, the customer's credit card number and card features are generally received from the POS terminal 108. In addition, the merchant name, the merchant location, the interaction date, the time of day, the industry, and the purchase price are also generally determinable and thus may be collected and stored in the database 112. If the credit card processor also happens to be the issuer of the purchase card being used, the name of the customer 104, their mailing address, email address, credit limit, purchase card currency, credit rating at the time of card issue, and other demographic information may also be known. Thus, the database 112 likely comprises this information for the customer 104 as well as many others. It is therefore an aspect of the present disclosure to provided improved systems and methods for collecting such data and leveraging the data to predict customer behavior at the time of a transaction.

Figure 2:
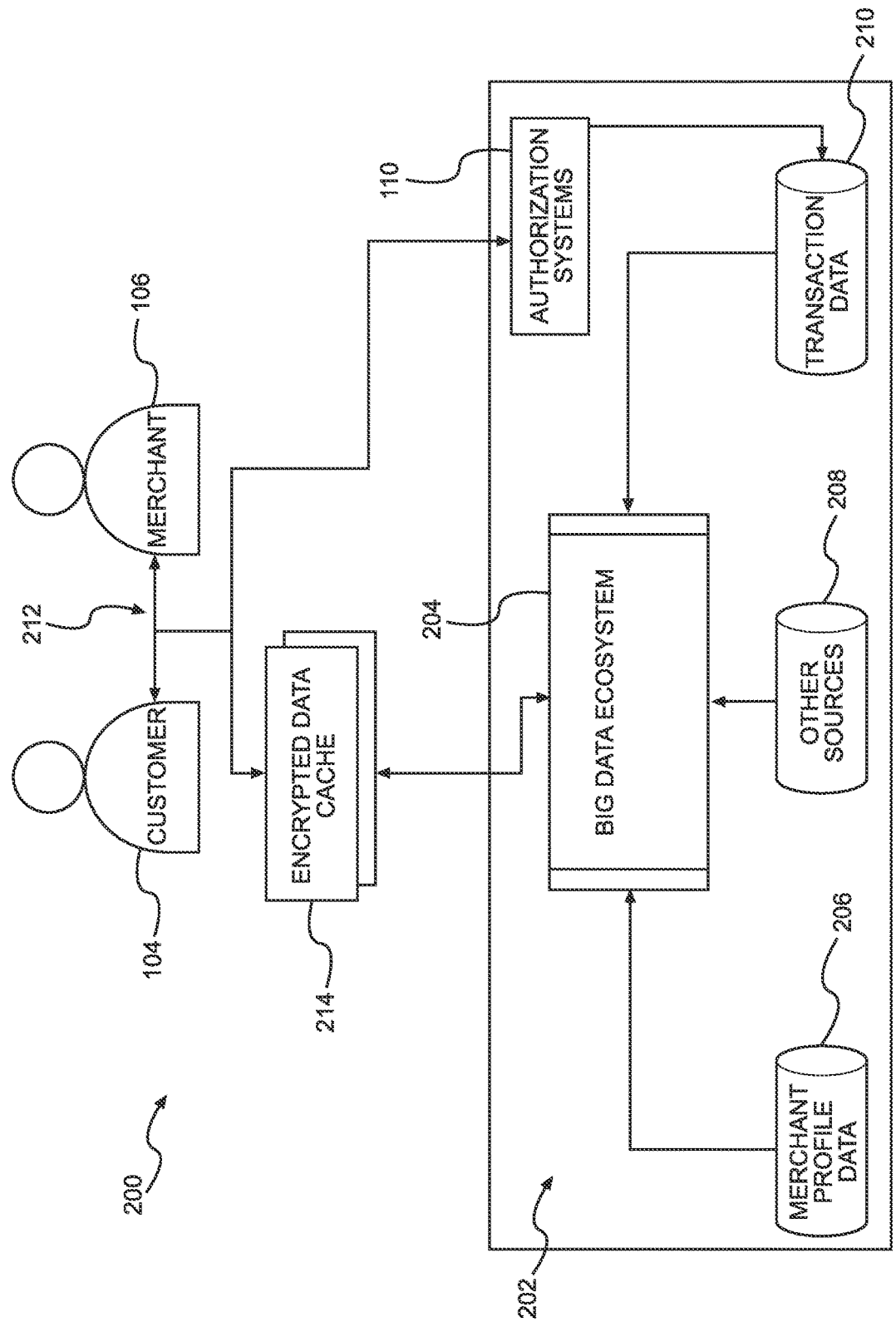
FIG. 2 is a diagram of an interaction between a merchant and customer conducting an electronic transaction according to an exemplary embodiment.

FIG. 2 is illustrative of a data flow 200 during a digital sales transaction between a customer 104 and a merchant 106 at a point of sale according to an exemplary embodiment. As used herein, a digital sales transaction or digital transaction refers to a transaction completed without the need for cash, such as credit or debit card purchases. It will be appreciated that other types of digital transactions where it is possible to collect real-time data about the transaction could also be used in connection with the systems and methods as disclosed here. In particular, the data flow 200 generally relates to the back end systems 202. The data processed and/or collected is used to develop the regression model used by the exemplary embodiment. As is illustrated in FIG. 2, data may be collected, stored, and processed by a big data ecosystem 204. It should be appreciated that in various other embodiments as described herein, big data ecosystem 204 may comprise other data ecosystems (i.e. smaller data ecosystems), environments, databases, and/or repositories, and that the term "big data" should not be construed as limiting. Big data ecosystem may comprise a plurality of servers or databases operable to collect, process, and store large amounts of data. It will be appreciated that big data ecosystem 204 comprises processing components operable to perform processing on data that is collected or stored at the big data ecosystem. The processing components of the big data ecosystem 104 may comprise at least one processor in communication with a memory, wherein the processor is operable to execute instructions stored in the memory. It will be further appreciated that big data ecosystem 204 may comprise one or more storage devices operable to store data collected or received by the big data ecosystem 204. In some embodiments, the storage devices of big data ecosystem 204 are distributed across one or more computers or servers operable to transmit and receive data over a network. It will be further appreciated that big data ecosystem 104 may have alternative configurations of hardware and software, and the above exemplary components are offered for illustrative purposes only.

In some embodiments, the data collected or received by the big data ecosystem 204 may include merchant profile data 206, other source data such as environmental data 208, and transaction data 210. The data collected by the big data ecosystem 204 may be collected from a single database or data repository, such as a kind operated by a large bank or financial institution, or additionally, from a plurality of databases, data repositories, or similar data sources distributed across a network. In some embodiments transaction data 210 may comprise historical transaction data related to past purchases by customer 104 and/or other customers. In one embodiment, this historical data may be obtained from authorization systems 110. Similarly, the big data ecosystem 204 may also collect transaction data related to a current, ongoing transaction. This data is collected as current transaction data 212, and may be collected at the time of the transaction, for example, in real-time or near real-time. The collected data may be processed at the big data ecosystem 204 by machine learning algorithms executed by processing components within the data ecosystem 204. These algorithms may be utilized by the big data ecosystem 204 in order to build additional algorithms used to provide a prediction of future customer behavior to the merchant at the time of a digital point-of-sale transaction.

Merchant profile data 206 may comprise information related to the merchant's business and indicate the characteristics of a desirable or "good" customer and corresponding customer behavior or spending habits. It will be appreciated that this behavior may be relative and can vary depending upon the merchant's business. For example, a coffee shop may consider a customer that spends $5 per visit and visits 5 days per week, a desirable customer. Conversely, a car dealer may require a much higher level of spending but would consider one visit every 24 months to be a desirable customer. The service department of that same car dealer may have an altogether different standard for a desirable customer. Thus, merchant profile data 206 facilitates consideration of customer behavior as related to the business type.

In addition to merchant data 206, the data ecosystem 204 may collect or receive data from other sources, such as environmental data 208. Environmental data 208 may comprise data relating to customer behavior. This data may be used to understand current customer activity (e.g. current transaction 212) and to predict future activity. In an exemplary embodiment, environmental data 208 may comprise information such as, but not limited to, a calendar of events, location data, location demographics, social media data, and/or merchant promotional activity. This information may be collected and processed by the big data ecosystem 204 to extract customer behavioral predictors. For example, a merchant 106 located along a parade route may experience a higher than normal level of traffic during the parade. In another example, a merchant 106 may be mentioned in a social media post which results in spike in customer activity. This environmental data 208 can be used to enhance the granularity of the predictions produced by models for predicting customer behavior. Examples of environmental data include, without limitation, a moving 60-day average transaction amount and weighting factors for weekday versus weekend data.

Figure 3:
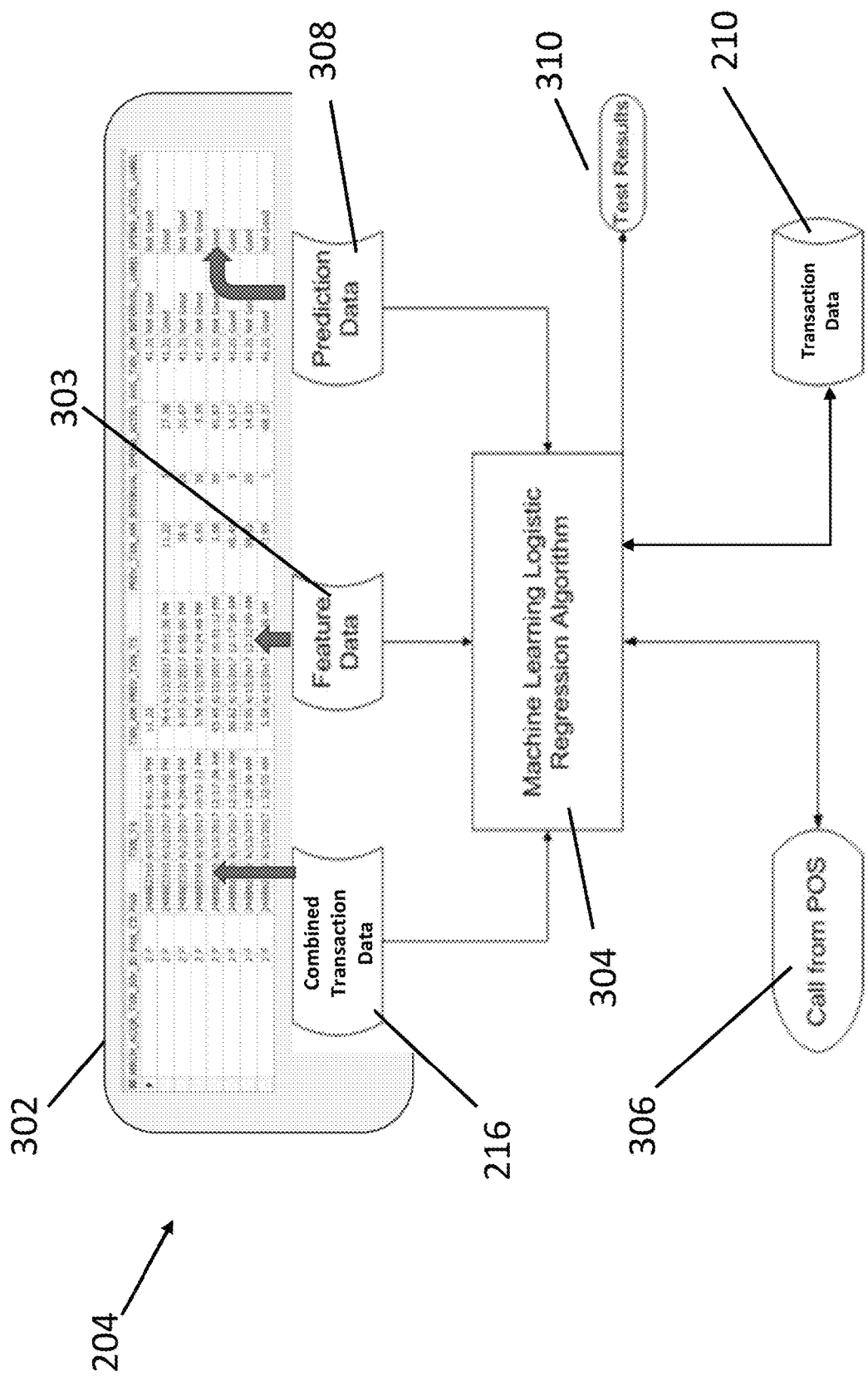
FIG. 3 is a diagram of a machine learning logistic regression algorithm and data associated with that algorithm according to an exemplary embodiment.

Transaction data 210 comprising historical data may be provided as a training dataset to the big data ecosystem 204 to develop an initial model to predict customer behavior. The historical data may comprise information regarding discrete transaction behavior of the customer as well as purchasing trends indicative of longer term behavior. Discrete transaction behavior may be correlated with longer term customer behavior to establish a model of the relationship between the two data sets. As is illustrated in FIG. 3, the data ecosystem 204 may collect data and build a logistic regression algorithm 304 for the use by a merchant (such as merchant 106). After this initial training dataset is constructed, the big data ecosystem 204 may receive transaction data 210 comprising historical data as well as current transaction data 212. For purposes of constructing training data sets for the big data ecosystem 204, transaction data 210 comprises historical transaction data which may include historical data from a plurality of merchants. In addition to historical data, the big data ecosystem 204 may receive current transaction data 212 e.g. in real-time or near real-time.

In an exemplary embodiment, the big data ecosystem 204 may learn from transaction data 210 which comprises historical transaction data associated with customers 104 who exhibit the behavior desired by the merchant 106. This behavior can be obtained from the transaction data 210 but may also be obtained in real-time or near real-time by processing current transaction data 212 and feature data 303 that has been correlated with historical data 210 reflecting the past purchasing behaviors of the customer 104. As a result, the logistic regression algorithm 304 utilized by the big data ecosystem 204 can continuously learn from customer behavior. As is illustrated in FIG. 2, other data, such as environmental data 208 can also be used by the big data ecosystem 204 to account for various other factors in order to further refine the predictive capabilities of the data ecosystem.

Figure 4:
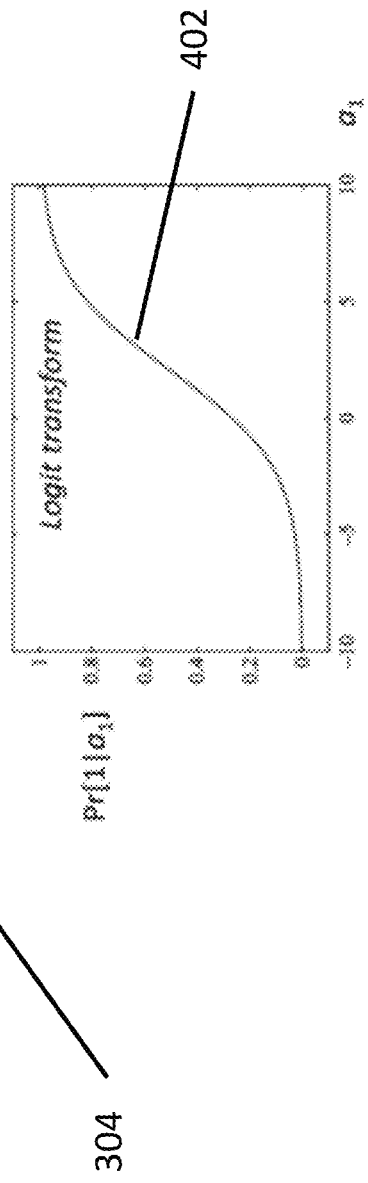
FIG. 4 is an illustration of a logistic regression algorithm of the type used by an exemplary embodiment.

The transaction data 210 and current transaction data 212 may be combined and loaded or otherwise transferred into a table 302 which can accumulate the data into combined transaction data 216. The table 302 may be a digital spreadsheet or the like configured to provide structure and enhance readability and interpretation of the data. Table 302 may also contain data related to prediction data 308 which comprises determined predictions of customer behavior produced by the logistic regression algorithm 304. In some embodiments, the combined transaction data 216 (e.g. transaction data 210 and current transaction data 212) may comprise merchant identifiers, timestamps, and amounts spent during a digital sales transaction. The combined transaction data 216 may further comprise feature data 303 which is data related to the time of the transactions and their amounts. This feature data 303 may be used to correlate data related to the change in transaction details from a first to a second transaction and generate new data describing this change. The frequency of customer visits may be determined from this information as well as the changes in spending during each visit and an average transaction amount. A logistic regression algorithm 304 may be applied to the data to calculate a function representative of customer behavior. An example of the logistic regression algorithm 304 is illustrated in FIG. 4. As is shown, a threshold curve 402 is determined that can indicate a positive or negative prediction of future customer behavior depending upon where the customer's data falls relative to the threshold curve 402. This curve is developed and tested using the machine learning logistic regression algorithm 304 and the associated training dataset provided by the transaction data 210. Results of this testing may be output by the logistic regression algorithm 304 as test results 310.

Once the threshold curve 402 is determined, the logistic regression algorithm 304 can be applied to current transaction data 212 e.g. in real-time or near real-time. Referring again to FIG. 2, a customer 104 makes a purchase from a merchant 106 and the parties initiate a digital transaction. During the purchase, the customer 104 pays for the purchase using a payment card. As was noted in FIG. 1, this process generally requires that the payment card be read by a POS terminal 108 and the transaction be approved by a transaction authorization system 110. As is illustrated, the current transaction data 212 is provided to both the authorization system 110 and to the data ecosystem 204. In the illustrated example, the current transaction data 212 is transmitted to the data ecosystem 204 using an encrypted data cache 214. The processing of both the approval by the authorization system 110 and the customer behavior prediction from the data ecosystem 204 can be performed in real-time or near real-time. Thus, the merchant 106 may receive approval concurrently with receipt of the predicted customer behavior.

Figure 5:
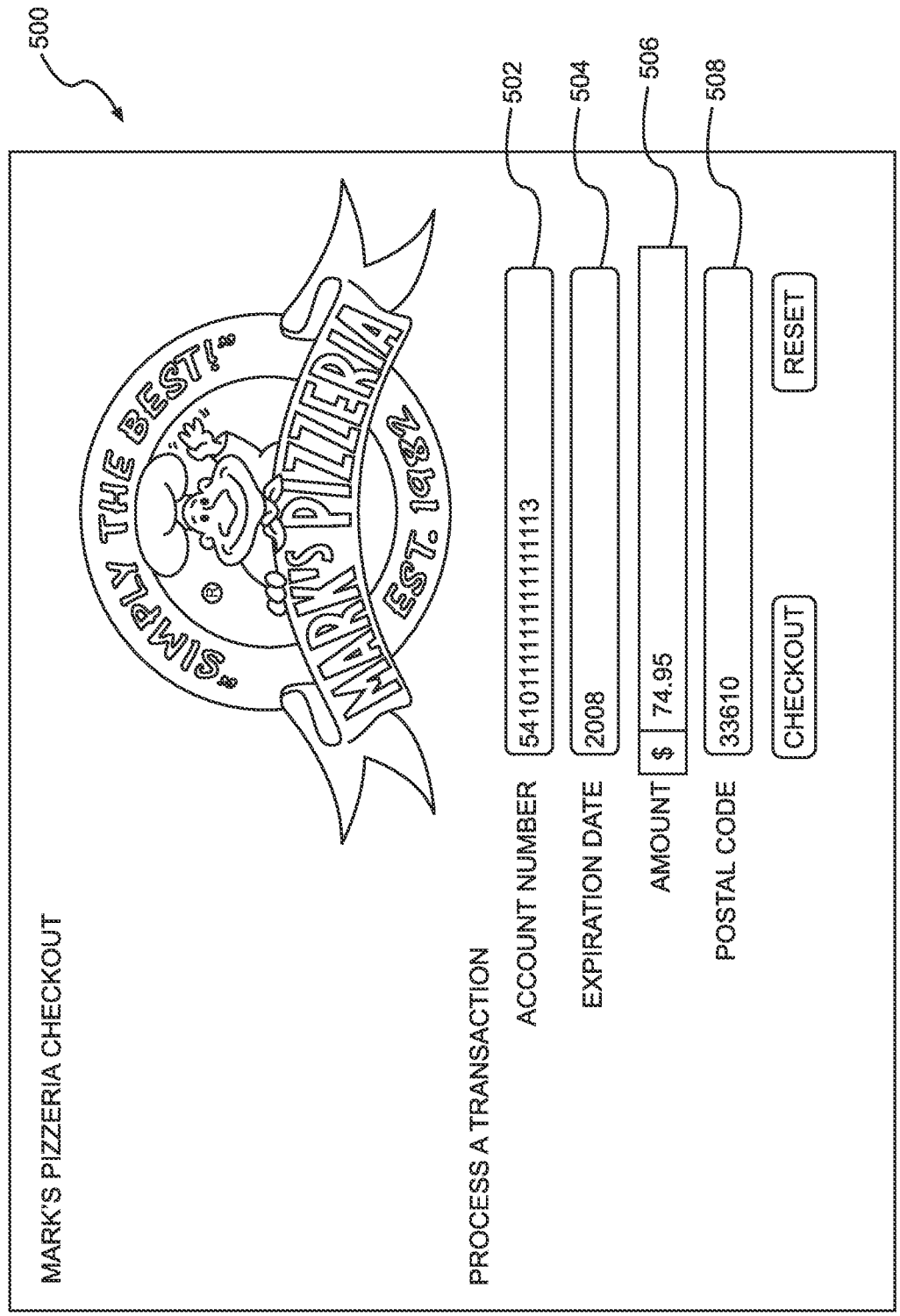
FIG. 5 is a user interface produced by an exemplary embodiment.
Figure 6:
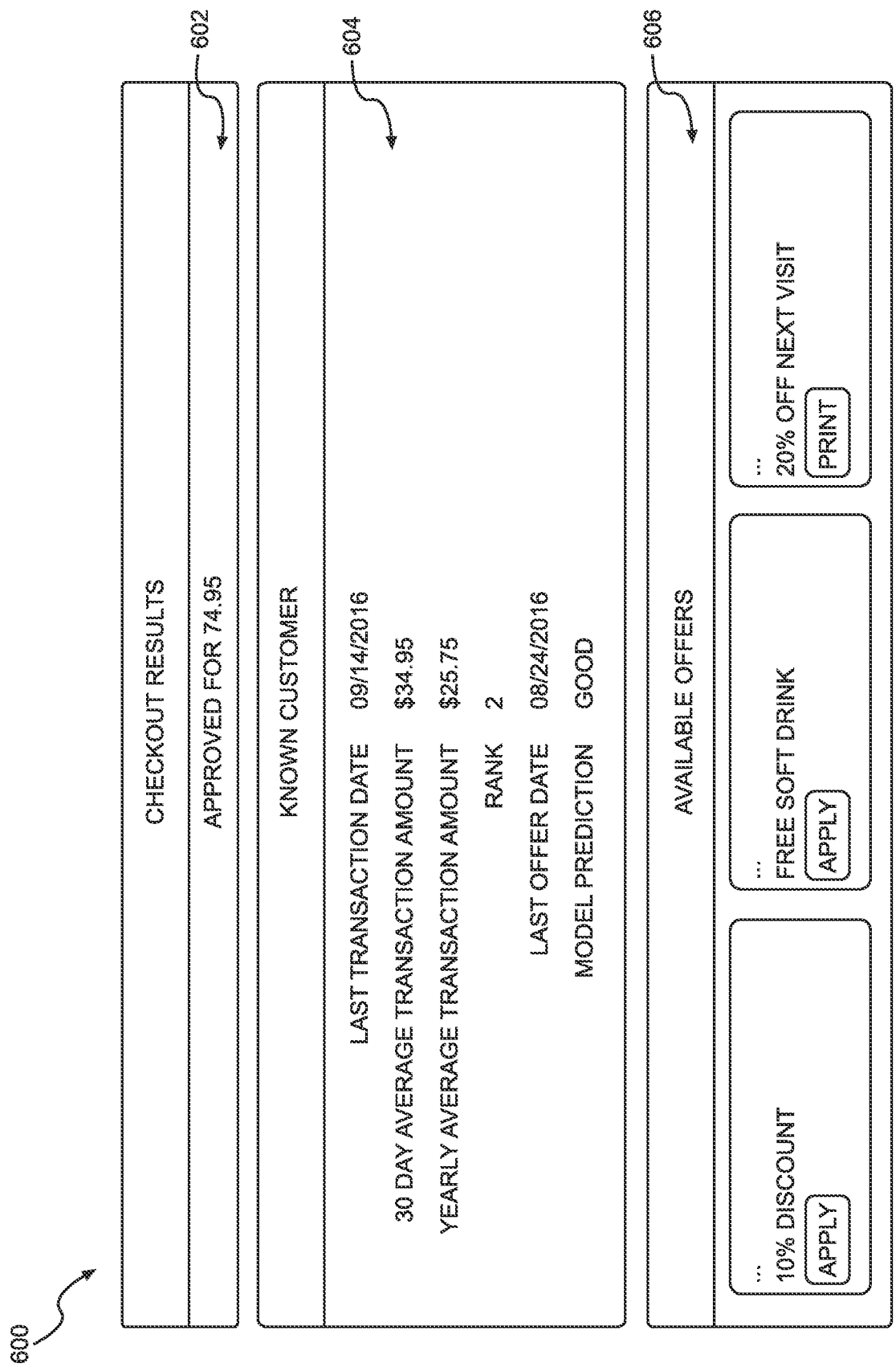
FIG. 6 is another example of a user interface produced by an exemplary embodiment.

An example payment card processing interface 500 is illustrated in FIG. 5. As shown, the card account number 502 is provided. In addition to the card number 502, the expiration date 504, the amount 506, and the cardholder's postal code 508 may be provided either directly from the card or by the customer 104 or merchant 106. In some embodiments, additional information pertaining to the transaction may be required, such as personal identification number (PIN), card issuer, bank, etc. This information can be provided to the big data ecosystem 204 and authorization system 110 as illustrated in FIG. 2. In some embodiments, the big data ecosystem 204 is in communication directly with the authorization system 110 and can request and collect the data from the authorization system. Presuming the transaction is approved, a user interface 600 such as the exemplary embodiment illustrated in FIG. 6 is displayed to the merchant 106 in response to the approval of the transaction. As shown, the user interface 600 may comprise an approval 602, customer information 604, and, in the example illustrated, a selection of rewards 606 that may be presented to the merchant 106 or the customer 104. Typically, at least one of the offered rewards will involve an immediate benefit (e.g., a free additional item or a refund or reduction in the current transaction amount). In an exemplary embodiment of the invention, the selection of offers 606 is determined by the result of calculations performed by the big data ecosystem 204.

As illustrated in FIG. 3, the machine learning logistic regression algorithm 304 may receive a communication or call 306 from the POS terminal 108, which includes transaction data as illustrated in FIG. 5. The logistic regression algorithm 304 may then generate prediction data 308. The prediction data 308 may be used to generate a selection of offers 606. The selection of offers 606 may be generated based on the data collected by the big data ecosystem 204, such as the current transaction data, historical transaction data, environmental data, or the like. In an exemplary embodiment, this prediction process can happen in real-time or near real-time such that the prediction may be made and the selection of offers generated and sent for display to the merchant or the customer immediately after the purchase has been approved. In certain embodiments, the selection of offers 606 is presented to the user in the form of a text message or notification delivered to a mobile device associated with the customer or the customer's payment card. In some embodiments, the approval may be withheld to account for any discounts or variations in the purchase offered in the selection of offers 606. In some embodiments, the selection may vary according to preferences determined by the merchant 106. In other embodiments, a promotional offer or reward may automatically be applied to the transaction based on merchant 106's preferences.

The merchant 106 may choose to offer one or more of the rewards to the customer 104 at the time of the transaction based on the selection of offers 606. Because the transaction and customer information can be processed by the exemplary embodiment in real-time or near real-time, the customer 104 may be presented with the rewards concurrently or immediately after the transaction. This interaction may help to make the customer 104 feel appreciated instantly and also serve to reward the behavior desired by the merchant (making a purchase in the illustrated example), which is expected to better strengthen the relations (e.g. loyalty) between the merchant and the customer than other forms of rewards that provide a more delayed form of satisfaction.

In some embodiments, a customer may choose to pay with a contactless payment method, for example, contactless credit card, Apple Pay, Google Pay, or the like. In these embodiments, the transaction between customer 104 and merchant 106 occurs identically to a traditional credit or debit card payment transaction, however, the merchant does not handle a physical payment card, and instead, the customer may place a payment card or mobile device in proximity to a contactless payment terminal, for example a reader utilizing radio frequency identification (RFID) or near field communication (NFC) to collect payment information in the same or similar way as a traditional payment card. In such situations, the presently described systems and methods may be applied such that a customer is provided with an interface such as user interface 600 to select a reward, discount, or other promotional offer. In certain embodiments, a reward or promotional offer is given to customer 104 automatically based on calculations performed by the big data ecosystem 204.

While the present disclosure and associated concepts have been illustrated by the description of various embodiments thereof, and while these embodiments have been described in considerable detail, it is not the intention of the Applicant to restrict or in any way limit the scope of the disclosure to such detail. Additional advantages and modifications will readily appear to those skilled in the art. Moreover, in some instances, elements described with one embodiment may be readily adapted for use with other embodiments. Therefore, the disclosure, in its broader aspects, is not limited to the specific details, the representative apparatus, and illustrative examples shown and described. Accordingly, departures may be made from such details without departing from the spirit or scope of the general concepts described and enabled herein.

What is claimed is:

1. A method for predicting customer behavior at a point of sale by a payment card processor, the method comprising:
developing, by the payment card processor, a customer behavior prediction tool by,
collecting environmental data relating to behavior of a plurality of customers and historical data that includes at least one from among discrete transaction behaviors and purchasing trends of the plurality of customers, the environmental data including a moving sixty-day average transaction amount for the plurality of customers, geographic location data, event data in a calendar for the geographic location, demographic data of the geographic location, social media data, and merchant promotional data;
weighting the environmental data based on at least one factor, the at least one factor including a day of the week;
automatically generating at least one model based on the weighted environmental data and the historical data by using logistic regression that includes at least one machine learning algorithm;
automatically training the at least one model by using a training dataset that includes the weighted environmental data and the historical data; and
testing the at least one model by using the training dataset;
receiving, by the payment card processor, current transaction data related to a digital transaction that includes a cashless transaction between a merchant and a customer at the point of sale;
authorizing, by the payment card processor, the digital transaction based on the current transaction data;
receiving, by the payment card processor in real-time with the authorizing, historical transaction data related to past purchasing behavior of the customer;
identifying, by the payment card processor in real-time with the authorizing, the customer as a desirable customer by,
determining a correlated data set by using the current transaction data, the historical transaction data, and the at least one model, the correlated data set relating to a correlated change between a first past transaction and a second past transaction;
determining a frequency of visits, a spending change during each of the visits, and an average spending amount for the visits by using the correlated data set;
generating a threshold curve based on the correlated data set, the frequency of visits, the spending change during each of the visits, and the average spending amount for the visits, the threshold curve relating to an indication of desirability;
testing the threshold curve by using a machine learning logistic regression algorithm and the historical transaction data; and
applying the machine learning logistic regression algorithm to the current transaction data in real-time;
displaying, by the payment card processor in real-time via a text message delivered to a mobile device associated with the customer, an approval of the digital transaction based on a result of the authorizing concurrently with at least one reward that includes an immediate benefit for selection based on a result of the identifying; and
updating, by the payment card processor, the at least one model by using the current transaction data and the historical transaction data.

2. The method of claim 1, wherein the current transaction data is received in real-time.

3. The method of claim 1, further comprising:
receiving environmental data and merchant profile data related to the merchant.

4. The method of claim 3, further comprising:
generating at least one promotional offer for selection by the merchant to present to the customer at the point of sale.

5. The method of claim 4, wherein the at least one promotional offer is based on the historical transaction data.

6. The method of claim 4, wherein the at least one promotional offer is based on the environmental data related to the merchant.

7. The method of claim 1, further comprising:
generating at least one future purchase prediction of the customer based on the current transaction data and the historical transaction data.

8. The method of claim 7, wherein identifying the customer as desirable is based on the at least one future purchase prediction.

9. A system for predicting customer behavior at a point of sale by a payment card processor, the system comprising:
a data processor of the payment card processor;
a memory; and
a communication interface coupled to each of the data processor and the memory,
wherein the data processor of the payment card processor is configured to:
collect environmental data relating to behavior of a plurality of customers and historical data that includes at least one from among discrete transaction behaviors and purchasing trends of the plurality of customers, the environmental data including a moving sixty-day average transaction amount for the plurality of customers, geographic location data, event data in a calendar for the geographic location, demographic data of the geographic location, social media data, and merchant promotional data;
weight the environmental data based on at least one factor, the at least one factor including a day of the week;
develop at least one model based on the weighted environmental data and the historical data by using logistic regression that includes at least one machine learning algorithm;
train the at least one model by using a training dataset that includes the weighted environmental data and the historical data;
test the at least one model by using the training dataset;
collect current transaction data related to a digital transaction that includes a cashless transaction between a merchant and a customer at the point of sale;
authorize the digital transaction based on the current transaction data;
receive historical transaction data related to past purchasing behavior of a customer;
identify the customer as a desirable customer by causing the data processor of the payment card processor to:
determine a correlated data set by using the current transaction data, the historical transaction data, and the at least one model, the correlated data set relating to a correlated change between a first past transaction and a second past transaction;
determine a frequency of visits, a spending change during each of the visits, and an average spending amount for the visits by using the correlated data set;
generate a threshold curve based on the correlated data set, the frequency of visits, the spending change during each of the visits, and the average spending amount for the visits, the threshold curve relating to an indication of desirability;
test the threshold curve by using a machine learning logistic regression algorithm and the historical transaction data; and
apply the machine learning logistic regression algorithm to the current transaction data in real-time;
display, in real-time via a text message delivered to a mobile device associated with the customer, an approval of the digital transaction based on a result of the authorizing together with at least one reward that includes an immediate benefit for selection based on a result of the identifying; and
update the at least one model by using the current transaction data and the historical transaction data.

10. The system of claim 9, wherein the current transaction data is received in real time.

11. The system of claim 9, wherein the data processor is further configured to collect environmental data and merchant profile data related to the merchant.

12. The system of claim 11, wherein the data processor is further configured to generate at least one promotional offer for selection by the merchant to present to the customer at the point of sale.

13. The system of claim 12, wherein the at least one promotional offer is based on the environmental data related to the merchant.

14. The system of claim 12, wherein the at least one promotional offer is based on the historical transaction data.

15. The system of claim 14, wherein the data processor is further configured to generate at least one future purchase prediction of the customer based on the current transaction data and the historical transaction data.

16. The system of claim 15, wherein the customer is identified as a desirable customer based on the at least one future purchase prediction.

17. The system of claim 16, wherein the data processor is further configured to receive transaction data from an encrypted data cache.

18. The system of claim 17, wherein the data processor is configured to decrypt the data received from the encrypted data cache.

19. A method for offering a promotional award by a payment card processor at the point of sale between a customer and a merchant, the method comprising:
developing, by the payment card processor, a customer behavior prediction tool by,
collecting environmental data relating to behavior of a plurality of customers and historical data that includes at least one from among discrete transaction behaviors and purchasing trends of the plurality of customers, the environmental data including a moving sixty-day average transaction amount for the plurality of customers, geographic location data, event data in a calendar for the geographic location, demographic data of the geographic location, social media data, and merchant promotional data;
weighting the environmental data based on at least one factor, the at least one factor including a day of the week;
automatically generating at least one model based on the weighted environmental data and the historical data by using logistic regression that includes at least one machine learning algorithm;
automatically training the at least one model by using a training dataset that includes the weighted environmental data and the historical data; and
testing the at least one model by using the training dataset;
receiving, by the payment card processor, current transaction data related to a digital transaction that includes a cashless transaction between the customer and the merchant;

authorizing, by the payment card processor, the digital transaction based on the current transaction data;

receiving, by the payment card processor in real-time with the authorizing, historical transaction data related to past purchasing behavior of the customer;

identifying, by the payment card processor in real-time with the authorizing, the customer as a desirable customer by, determining a correlated data set by using the current transaction data, the historical transaction data, and the at least one model, the correlated data set relating to a correlated change between a first past transaction and a second past transaction;

determining a frequency of visits, a spending change during each of the visits, and an average spending amount for the visits by using the correlated data set;

generating a threshold curve based on the correlated data set, the frequency of visits, the spending change during each of the visits, and the average spending amount for the visits, the threshold curve relating to an indication of desirability;

testing the threshold curve by using a machine learning logistic regression algorithm and the historical transaction data; and applying the machine learning logistic regression algorithm to the current transaction data in real-time;

generating at least one promotional offer for the customer;

displaying, by the payment card processor in real-time via a text message delivered to a mobile device, an approval of the digital transaction based on a result of the authorizing concurrently with the at least one promotional offer that includes an immediate benefit for selection based on a result of the identifying; and updating, by the payment card processor, the at least one model by using the current transaction data and the historical transaction data.

20. The method of claim 19, wherein the current transaction data is received from an encrypted data cache.

\* \* \* \* \*